United States Patent [19]
Ridlehuber

[11] 3,838,780
[45] Oct. 1, 1974

[54] STORAGE UNLOADING SYSTEM

[76] Inventor: Eugene V. Ridlehuber, 1720 Canyon St., Plainview, Tex. 79072

[22] Filed: Aug. 9, 1973

[21] Appl. No.: 387,113

[52] U.S. Cl............ 214/16 R, 198/140, 214/17 DB
[51] Int. Cl............................................. B65g 65/42
[58] Field of Search........ 214/10, 16 R, 17 D, 15 E, 214/17 DA, 17 DB; 198/140

[56] References Cited
UNITED STATES PATENTS
| | | | |
|---|---|---|---|
| 3,025,980 | 3/1962 | Maier et al. | 214/10 |
| 3,144,142 | 8/1964 | Wallace | 214/15 E |

*Primary Examiner*—Robert G. Sheridan
*Attorney, Agent, or Firm*—Ely Silverman

[57] ABSTRACT

Masses of grain are smoothly unloaded from a flat-floored storage building to a below-floor conveyor at an even rate, notwithstanding usual surges in discharge from the upper portions of such grain masses, by an elongated unitary movable above-floor conveyor assembly extending from near a side wall of the storage building to a vertical passage in the floor of that building to the below-floor conveyor. Because the above-floor conveyor assembly evens out irregularities in the flow rate from the mass to the below-floor conveyor, the below-floor conveyor operates without surges thereinto or therefrom. The even rate of flow of the feed to the under-floor conveyor permits rpaid spillfree moving of masses of grain to and from different portions of the storage building and to the exterior thereof.

3 Claims, 16 Drawing Figures

STORAGE UNLOADING SYSTEM

BACKGROUND OF THE INVENTION

1. The Field of the Invention:

The fields of art to which this invention pertains are grain storage, grain handling and conveying.

2. Description of the Prior Art:

While flat floored grain storage structures are economical to construct, one-third of their volume remaining after free flow discharge is not amenable to economical emptying; "cataracting" and surges of materials jam usual conveying means and are dangerous to manual laborers attempting to unload such remaining portion of the grain mass; clam shell and bulldozer unloading requires removal of the aeration ducts that are essential to best grain storage practices. Also, "turning" of some portions of the grain in large cylindrical bins requires moving other large portions of the mass not requiring such attention, while the apparatus according to this invention permits moving selectively those portions of the grain mass disposed over large longitudinally and horizontally extending areas.

Series combinations of multiple series connected sectionalized pivotally connected conveyors deposit the output of each section thereof at points spaced away from the input to next section of the series so that the next one of the conveyors in such series does not continuously receive all of the output of the preceding section and the combination provides surges of output at the output end of the combination. Also, the power requirement of the different sections vary at any one moment of the operation of such type of apparatus so that, in gross, substantially more power is required by such apparatus than in this invention. Further still, the attention of several operators is required to be applied to several different conveyors and the different conditions of each of their operations and manipulation of such combinations, even for inefficient results obtained therefrom, is difficult.

SUMMARY OF THE INVENTION

A movable conveyor assembly comprises a light, flexible resilient frame and, supported thereon, a dimensionally stable conveyor belt supporting a series of like buckets, each bucket with a downwardly and forwardly facing opening and each bucket with an upwardly and rearwardly sloped bottom wall and having side walls. The belt, supported on the frame, extends horizontally from near to the side of a storage building to a discharge orifice in the floor thereof and thence to a fixedly located below-floor conveyor.

The combination of frame, belt and buckets of the movable conveyor provides for automatically carrying material at a high rate from zones of rapid discharge of grain from the grain masses to be unloaded to other zones of the grain mass in contact with the movable conveyor assembly that are between the building walls and the discharge orifice and, therefrom, at a constant output rate, to the discharge orifice. This flow-evening action results from a change in angle of the surface presented by the buckets and the grain therein to the downwardly moving semi-fluid granular mass as the loading of such buckets increases, whereby not only does the carrying capacity of the buckets increase as the load before them increases but also, by cooperation of bucket shape and belt action on the flexible frame, an automatic load carrying limiting effect is provided which avoids jamming the conveyor assembly; also, by cooperation of the bucket shape and belt action, an automatic unloading of excessive carried material is effected: thereby, an even rate discharge is effected from such conveyor assembly notwithstanding the frequent and usual uneven rates of flow of the grain from the to-be-unloaded mass. The efficiency, capacity and reliability of the entire system of storage building and underground conveyor and related conveyors and storage facilities is improved greatly by the uniform loading of the underground conveyor effected by the operation of the movable conveyor assembly.

BRIEF DESCRIPTION OF THE DRAWINGS:

TABLE I provides data on the preferred embodiment.

DESCRIPTION OF THE PREFERRED EMBODIMENT

The overall system 20 of this invention includes a storage building 21 and the apparatus 50 in operative combination therewith.

The grain storage building 21 comprises a solid flat rectangular floor 22 provided with an overhead sloped roof 23, a vertical front wall 24, a vertical rear wall 25, in operative connection to left side vertical wall 26, right side vertical wall 27 and a plurality of holes as 28A, 28B in the floor 22 leading to a conveyor 48 in the underground walk-through conveyor tunnel 29 which tunnel and conveyor extend the full length of the building 21.

The building 21 also includes aeration ducts such as main aeration duct line 31 and aeration branch ducts such as 32A and 32B as described in U.S. Patents and standard in grain storage art. An intake building 33 provides locations for grain trucks as 35A and 35B to empty the contents of their grain carriers into a receiver chamber, as 36, which chambers are operatively connected as by an elevator 37 to a distributing conveyor 38 in the roof 23 of the building 21. Spouts 39 pass the grain from the conveyor 38 into the interior of building 21. Probes 40A-40M are located at various depths all along the length, width and height of the volume of the storage building 21 for purposes of locating hot spots therein.

According to this invention, the operator 30 manipulates control apparatus for and thereby moves the apparatus 50 so as to empty grain from above floor 22 of the building 21 to the tunnel conveyor 48 at an even volumetric rate so as to not overload that conveyor notwithstanding irregularities in feed to the apparatus 50.

In operation of the system 20, grain emptied into the discharge or receiver chamber 36 is transferred through elevators as 37 and distributor conveyor 38 to provide a mass of grain 42 within the building 21. The portion 43 of the mass of grain 42 above the plane corresponding to its angle of repose as 44A and 45A flows to and through each of the open holes as 28 and empties onto the belt conveyor 48 located in the tunnel 29. The conveyor 48 transfers all the material loaded thereon to the discharge conveyor elevators such as 49 which, in turn, transfers the thus conveyed grain to the storage elevator 34 (or to the discharge building as 33) from which the grain is discharged to trains as 34G on the roadbed 34R adjacent to such buildings 34, (as well as trucks as 35A and/or 35B).

The apparatus 50, according to this invention, comprises, in operative combination, a frame 50, buckets as 80, a belt 66 and a motor 72.

The frame 51 comprises a left side member 52, a right side member 53 and evenly spaced apart transverse frame members as 54A-G, each joined to members 51 and 52 from the front end 56 to the tail end 55 of frame 51. Each of the side members as 52 is formed of a series of I-beams and sections thereof as 57 and 58 and are joined firmly by rigid metal plates as 59. The frame 51 has a rear or tail end 55 and a discharge or front end 56.

The left side frame member 52, and right side frame member 53 rotatably support a rear pulley 60 and a front pulley 70. Take-up blocks 61 and 62 provide for some adjustment of the rear pulley and the front end of frame members 52 and 53 rotatably support a front pulley 70 which also has some adjustable pillow blocks. A standard electric motor 72 sits firmly on top of a motor support 73. Motor support 73 is a rigid frame that is firmly fixed to the front end 56 of frame 51. The output shaft of motor 72 — a 5 horsepower motor in the preferred embodiment — is operatively connected by a belt 75 to a speed reducer 76 which is operatively connected to a pulley shaft 77 which drives the front pulley 70.

Figure 1:
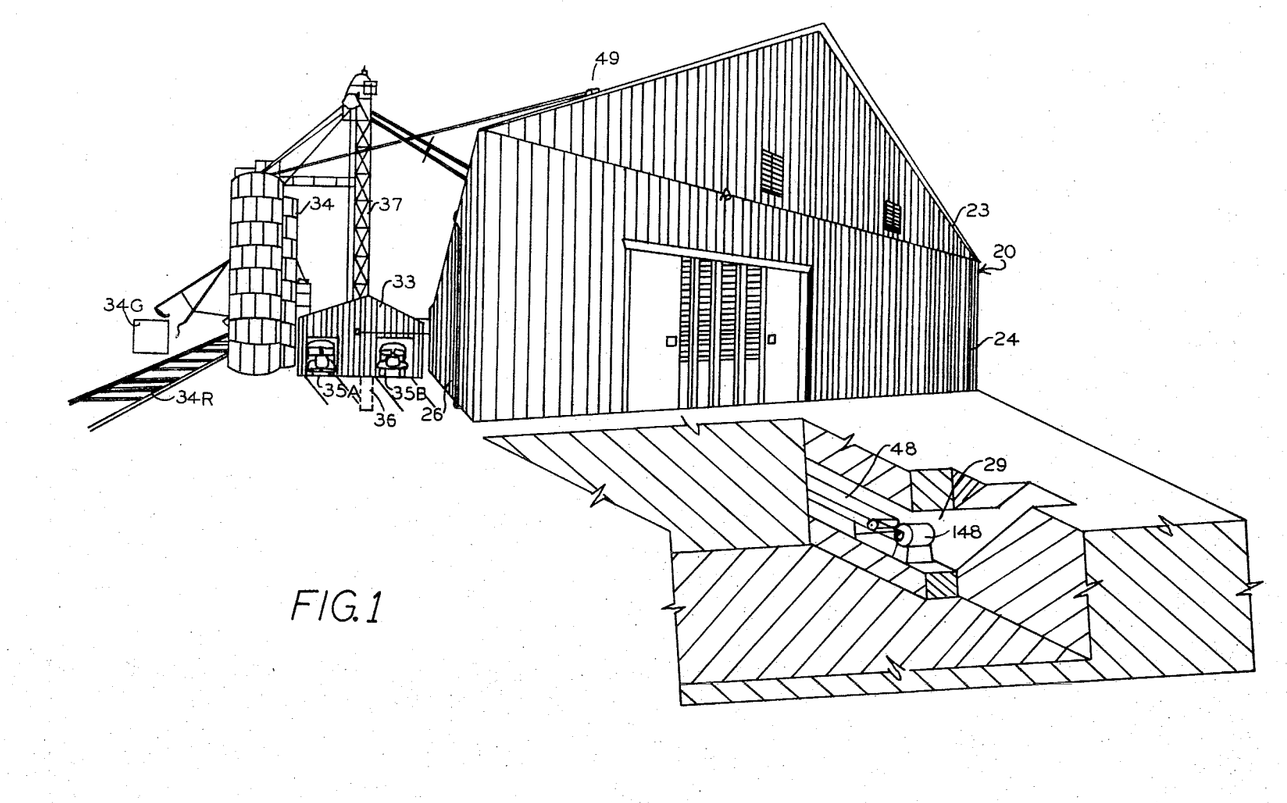
FIG. 1 is an overall exterior view of a storage building and portions of an assembly thereof wherein the apparatus of this invention is utilized.
Figure 2:
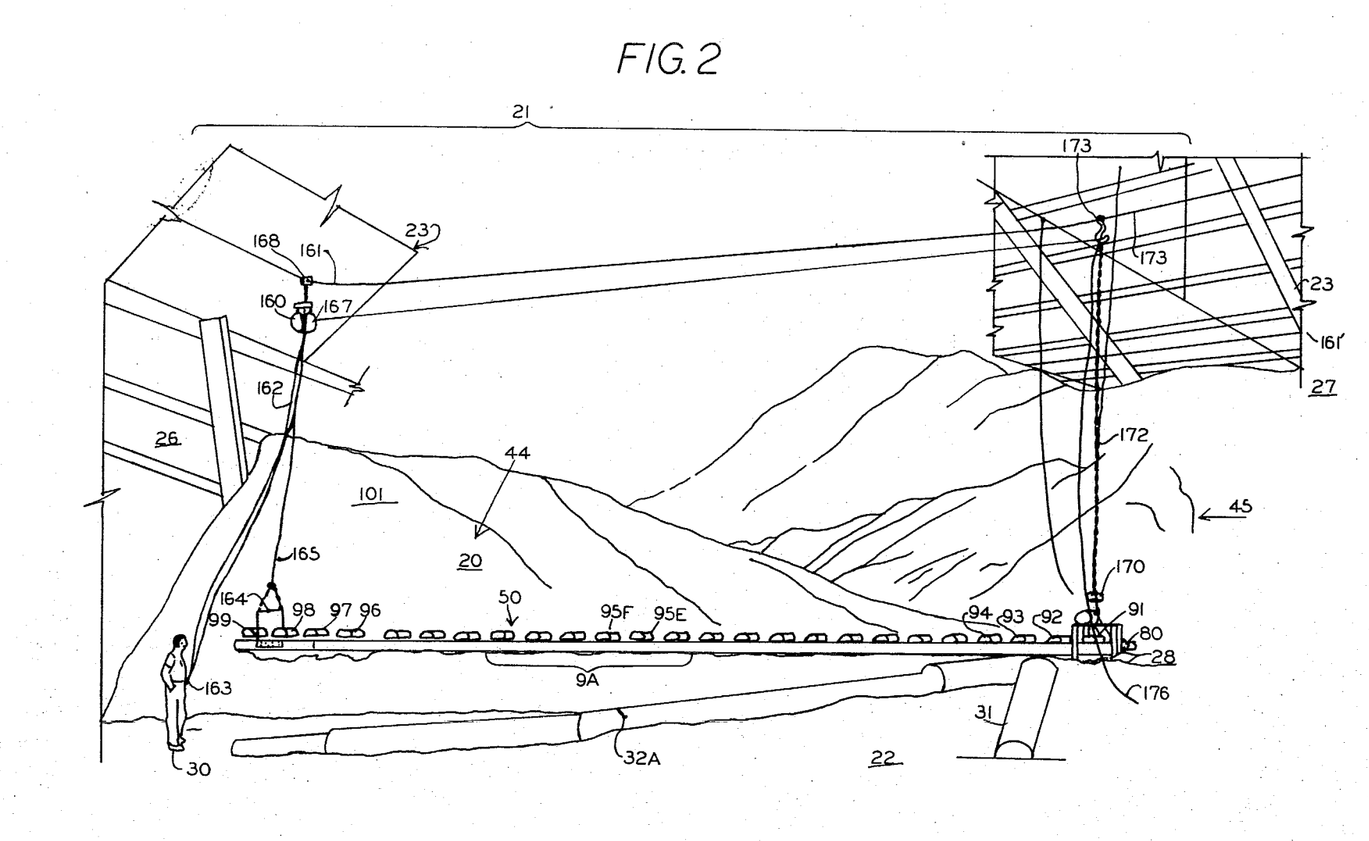
FIG. 2 is an overall perspective view of the interior of the building 21 showing the apparatus 50 of this invention in operation.

Belt 66 is made of a dimensionally stable yet flexible standard conveyor belt. It has an upper normally rearwardly driven belt length 67 and a lower normally forwardly driven belt length 68; the belt is wound around front pulley 70 and rear pulley 60. Pulley 70 engages and drives the belt while rear pulley 60, with the tensioning action thereon provided by frame 51 serving to maintain adequate tension in the belt. The belt has evenly spaced along the length thereof parallel supports for firmly holding thereto each of a plurality of like sized and shaped buckets as 91 through 94 shown at the front end of the top length 67 of the belt and buckets as 96A, 97A and 98A on the bottom length 68 of the belt and buckets 96, 97, 98 at the top rear of the belt and the bucket 80 at the front end of the belt and buckets 95A, 95B, 95C, 95D and 95E, 95F, 95G and 95H at intermediate positions of the belt, as shown in FIGS. 2 and 9.

Figure 6:
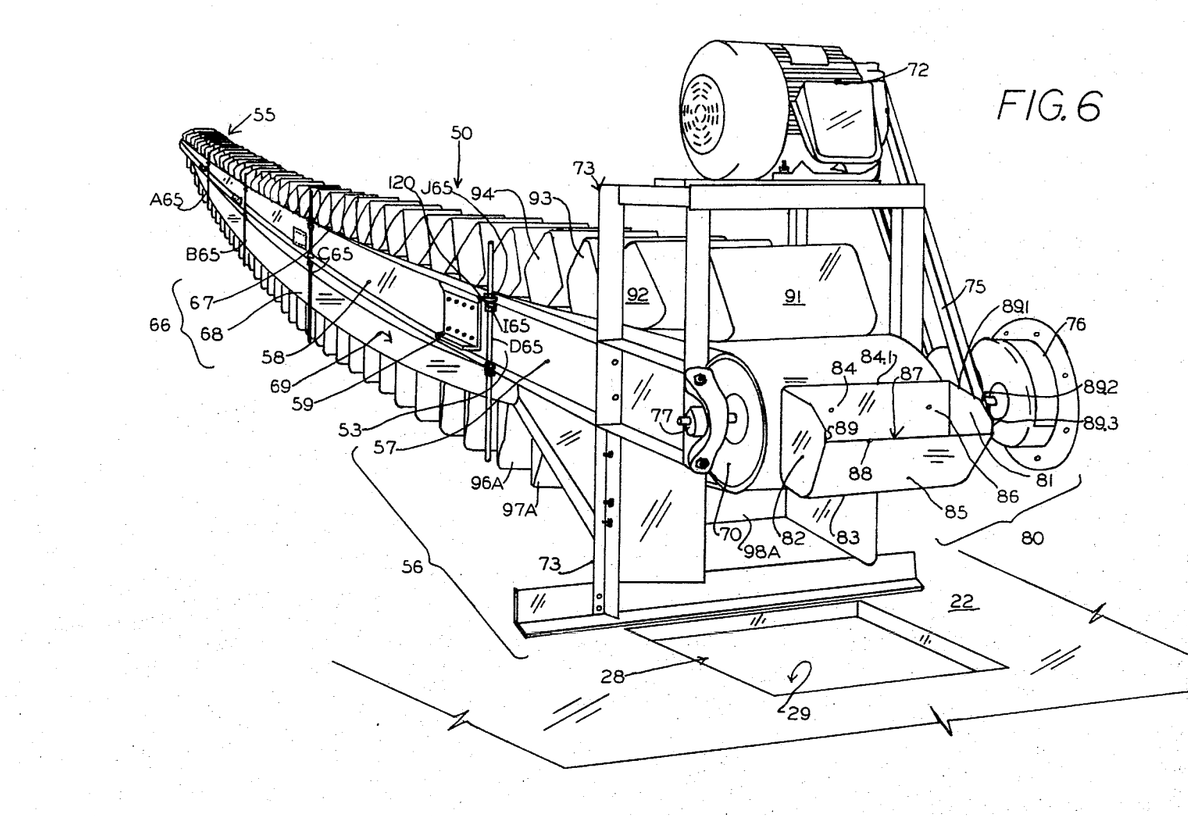
FIG. 6 is a perspective view of the apparatus 50 as seen from its front end and one side generally along the direction of the arrow 6A of FIG. 3C.
Figure 7:
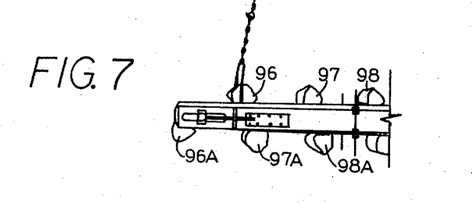
FIG. 7 is a side view of the tail end of the apparatus 50.
Figure 9:
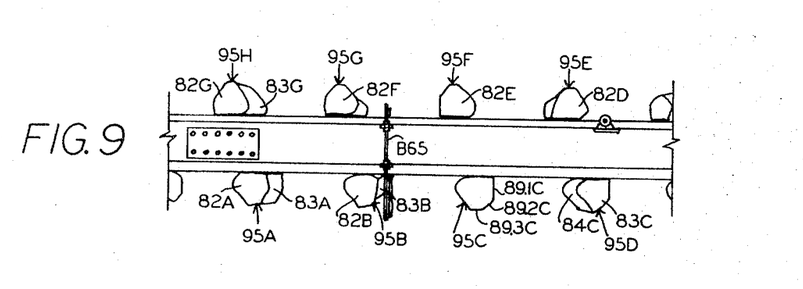
FIG. 9 is a side and perspective view of a central portion of the apparatus 50 shown in zone 9A of FIG. 2.
Figure 10A:
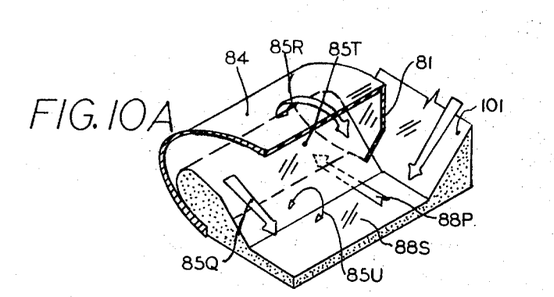
FIG. 10A is a perspective diagrammatic view of the flow of material into a bucket 80 of the apparatus 50.
Figure 10B:
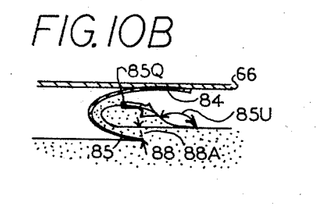
FIG. 10B is a diagrammatic vertical transverse sectional view of a bucket 80 when in a normally loaded mode of operation.
Figure 10C:
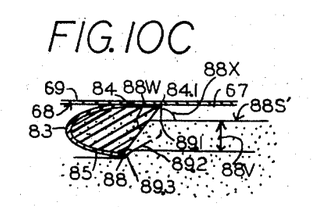
FIG. 10C is a diagrammatic vertical transverse view of bucket 80 in a peak loaded mode of operation.

The bucket 80 is similar to all the other buckets, as 91-98, held by the belt 66 and comprises an imperforate left side member 81, a right side member 82, a curved bottom portion 83, a rear plate 84 and a front wall 85 of the bucket 80. A bucket opening 86 is provided between the front edge 88 of the front wall 85 of the bucket and the rear wall 84. The rear wall 84 is firmly attached to the belt 66. Members 81-85 are imperforate and rigid and define an open topped chamber 87. Each of the side walls has a leading edge as 89 on wall 82; each side wall edge 89 has a. a rear side edge straight portion 89.1 perpendicular and adjacent to rear wall 84 and adjacent to the lateral portion of edge 84.1 of rear wall 84;

b. a front side edge portion 89.3 parallel to the rear wall 84 and adjacent to and extending forwardly (to right as shown in FIGS. 9, 10A, 10B, 10C and 11A; upward in FIG. 6) from the leading edge 88 of the bucket front wall 85 and c. an intermediate sloped side edge portion 89.2 that extends diagonally (upwardly and forwardly, as shown in FIG. 9, and upwardly and rearwardly, as shown in FIG. 6). The flat plane between edge 88 and top edge 84.1 of rear wall 84 is illustrated in FIG. 10C as 88W.

Each of several transverse frame members 54A-G is a straight rigid solid cylindrical metal rod and each is firmly attached at its ends to the interior walls of the side frame members 52 and 53 and each is longer than the width of belt 66. These transverse members are all of the same size and serve to space the portions of side wall members 52 and 53 uniformly from each other and also limit the vertical travel of the lower belt length relative to the lower edge of the frame members 51 and 52.

Upper rollers 63A, 63B, 63C are rotatably but firmly held to and positioned in journals on both sides thereof as 64A, 64B, 64C and 64AA, 64BB, 64CC respectively; the journals are firmly attached to the top of frame members 51 and 52, the belt 66 has a width slightly less than the horizontal spacing between the internal walls of side frame members. The lower surface of the upper belt length 67 rests on and moves over the rollers as 63A, 63B and 63C.

Figure 5:
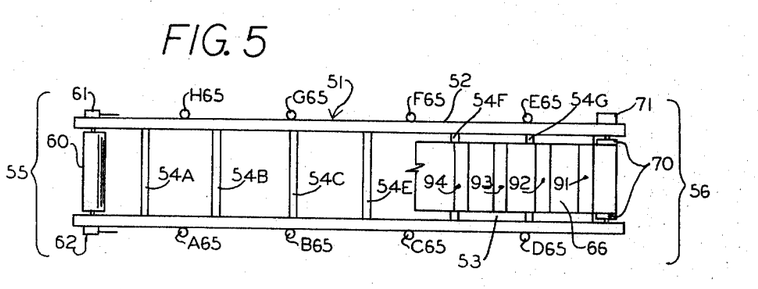
FIG. 5 is a diagrammatic broken-away top plane view of apparatus 50.

Adjustable vertical footing posts, as A65–H65 (shown in FIG. 5) are firmly yet adjustably attached to the outside of the frame side members 51 and 52. These posts are rigid adjustable rods and, in the operative position of apparatus 50, extend below the lower edge of frame members 51 and 52 to a greater distance than do the lowermost edges of the buckets supported on the lower length (68) of belt 66, as shown in FIGS. 6 and 9 in order to provide lateral stability to assembly 50, while allowing vertical motion thereof. Each of the posts as D65 is externally threaded and are firmly held to lugs or ears as 120 by nuts as 165 aand J65, which lugs are firmly and rigidly fixed to side frame members 53 and 52.

The building 21 is provided with a pair of longitudinal cables 161 and 161′, each of which runs or extends lengthwise of the building 21 parallel to tunnel 29 and each of which is located vertically at the level of the top of the vertical walls 25 and 26 and inwardly thereof. For operating on a mass as 44 adjacent wall 26, a supporting winch 160 and its motor are supported on cable 161 while the winch and motor 160 are on cable 161′ for operating on mass 45. A multi-cable electrical control line 162 is operatively attached to the motor of the winch and to a control switch therefor, 163, held by operator 30. A bail 164 is operatively attached to the frame members 52 and 53 at rear end 55 of frame 51 and a strong flexible cable 165 wound on winch 160 is operatively connected to the top of bail 164 for control of the vertical position of rear end 55 of frame 51 by operator 30.

One operator 30, standing on floor 22, is able to raise and manipulate the winch and motor 160 to raise and lower the tail end of the frame 51. Another motor 167 controlled by operator 30 is firmly attached to winch 160 and is operatively connected to a drive wheel 168 to drive winch 160 and its motor longitudinally of the building. The control switch 163 connects by conductors in cable 162 to selectively control the movement of winch 160 longitudinally of the building 21 via motor 167.

Another support motor 170 is operatively attached to a vertical support cable 172. Cable 172 extends downwardly from a movable roller support 174 on a longitudinally extending elevated horizontal cable 173. Motor 170 is attached to a hook on top of the frame 73 on the conveyor and provides, under control of operator 30, for movement of the frame front end 56 from one hole as 28 to another hole 28B displaced longitudinally along the structure 21 to move the entire apparatus 50 with a one man operation. A power cable 176 operatively connects to motors 72, 170, 160 and 167 and 148.

The apparatus 50 is directed to moving into the holes as 28 the masses of grain as 44 and 45 located below the plane of normal angle of repose of the mass 42. The angle of repose of the mass of grain 42 is shown as 44A and 45A in FIG. 2.

Generally, the process of operation of the apparatus 50 provides for moving masses of particulate material, such as the masses of grain 44 and 45 which masses have, in the overall upper surfaces as 46 and 47 at an angle to the horizontal floor 22 which angle is the same or less than the normal angle of repose of such particulate mass. The apparatus 50 serves to move portions of such mass along a line located in a flat vertical plane: that flat vertical plane is the vertical plane in which the apparatus 50 is moved. One end of that plane is located at the center of the hole 28 into which apparatus 50 discharges grain. The winch 160, under control of the operator 30, moves upward and downward in that plane while moving particulate matter from the mass as 44 towards and into hole 28 and therethrough to conveyor 28 at a uniform rate by apparatus 50.

Figure 4:
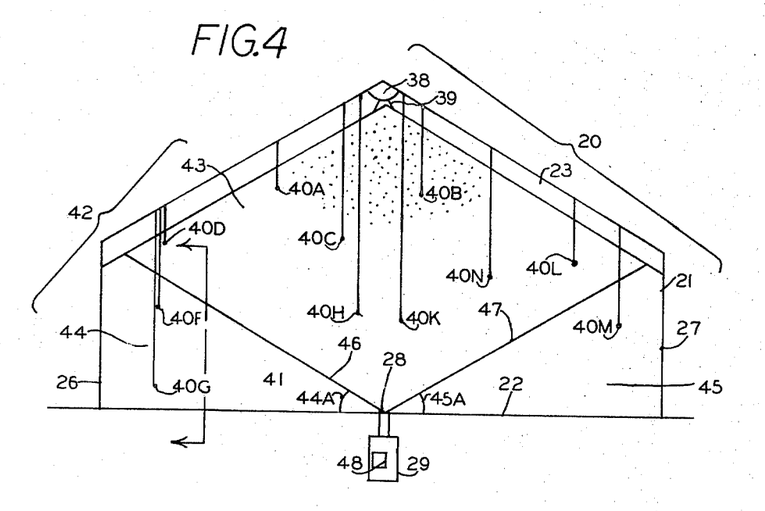
FIG. 4 is a diagrammatic section view through the storage building 21 of FIG. 1 to show the operational relationship of the various parts thereof in vertical cross-section.

In operation of apparatus 50, the frame 73 is located over a hole as 28 while the rear end of the apparatus 50 is moved downward as shown in FIG. 4 from the initial contact position 50A, to position 50B, to 50C to 50D, while smoothly moving grain from successive portions of mass 44 to the hole 28 and therefrom to the conveyor belt 48.

It is the nature of this type of triangular distribution of grain, as shown in FIGS. 2 and 4, for masses as 44 and 45 that when the grain is moved from the side wall as 26 to the central hole as 28 that most of such grain will come from the zone as 101 which is the highest zone or the zone of greatest height of the material left behind by the discharge mass of 43 above the upper surfaces 46 and 47. Such a zone is shown in section of FIGS. 3A, 3B and 3C. The usual mass of grain of such size is made of several different components and does not have a uniform flowability; rather, small portions of such mass are of different resistance to flow and have different angles of repose and, accordingly, cause "hang-ups" and cataracting.

Figure 3A:
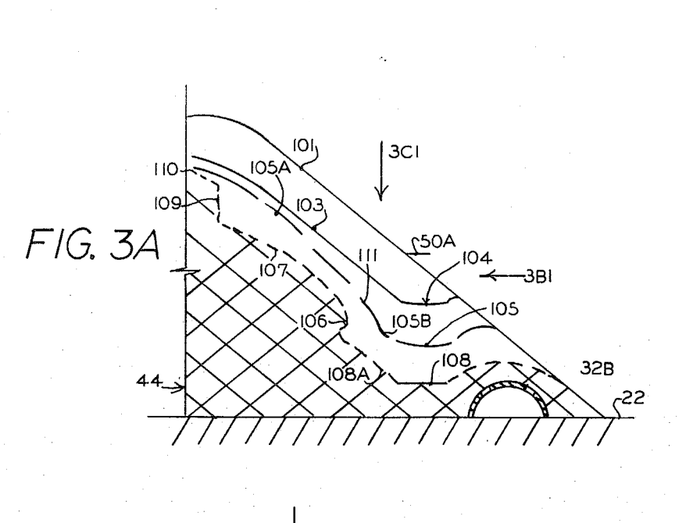
FIG. 3A is a set of vertical sectional views of a mass of grain as 44 along section 3A1–3A2 of FIG. 3B. This sectional view is the same as the transverse vertical section 3A3–3A4 taken through the top view of FIG. 3C. These views of mass 44 are taken to show the relative positions of apparatus 50 during its operation.
Figure 3B:
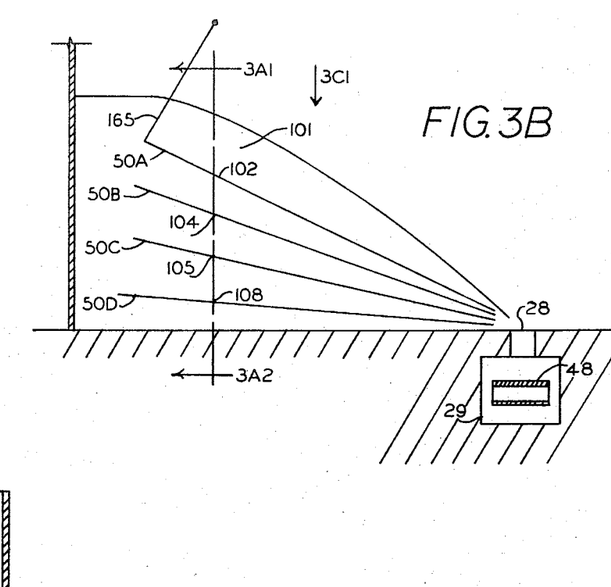
FIG. 3B is a side view along the direction of 3B1 of FIG. 3A to show the positions of the apparatus 50 of this invention during its operation.
Figure 3C:
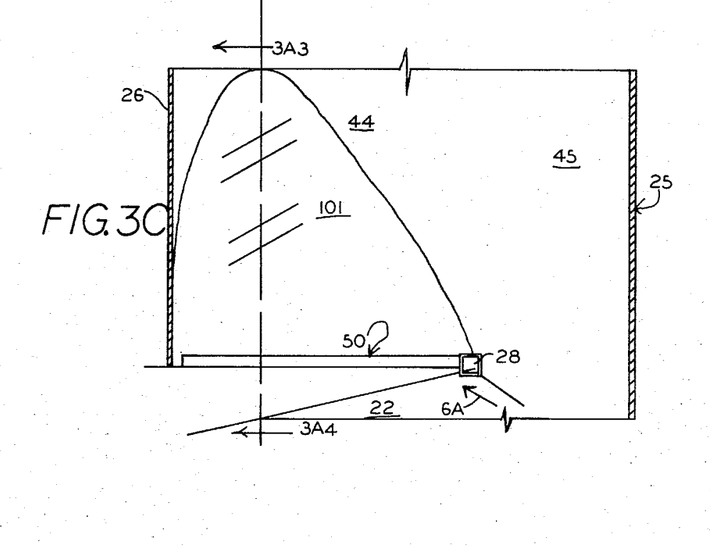
FIG. 3C is a top view along direction arrow 3C1 of FIGS. 3A and 3B.

In the normal operation of the apparatus 50, vertical portions of the grain mass as 44 known as cliffs, occur in the grain as shown by 109 at FIG. 3A. Additionally, when the moisture content of particular portions of grain or air to which such grain is exposed are high, the profile of the grain results in overhanging portions as indicated by 106 at FIG. 3A, especially after cooling at night: on its unloading, heavy surges occur at the zone of the greatest height of the masses as 44 and 45 (the masses of grain below the surface 46 and 47 indicative of the angles of repose radiating out from each hole as 28); nevertheless, such masses of grain are brought centrally, that is toward the hole 28, at an even rate of flow by use of the apparatus 50. As only a general description of the operation of apparatus 50, a single operator 30 controls the vertical position of the apparatus 50 by control of the hoist 160 that is operatively connected to the rear end of the frame 51. In general, the sloped surface as 101 of mass 44 is first contacted at level 102 by assembly 50 and portions of that surface are moved toward the zone of the hole 28. As the mass of grain is moved away from the surface outline 101, the level of the grain surface falls to a lower surface outline 103, — shown in FIG. 3A for illustrative purposes as having the same angle of the repose. Thereafter, the assembly 50 moves to a lower position 50B, shown in FIG. 3A as 104, vertically below zone whereat it first initially contacted the surface 101.

The above general description is only an approximation, as a matter of fact, as the grain of masses as 44 and 45 move away from the top of the mass 101 as above generally described, such movement is not of a homogeneous semi-fluid mass; rather, "slugs" or irregular flow rates and angles of surface develop and a cateracting action develops as steeper surface portions as 111 develop between surface portions as 105A and 105B, while apparatus 50 is at position 50C, shown as 105 in FIG. 3A; also, as illustrated in FIG. 3A, very steeply sloped portions of the top surface, as 109, develop between surface portions as 107 and 110 and "overhangs" as 106 develop between the surface portions 107 and 108A and as the apparatus 50 moves to a lower position as 108 and 50D. A cataractlike flow — very sudden and steep — develops with a slug of material from zone 106 to the level 108 as the apparatus 50 moves to position 50D as shown in FIG. 3A and soon another cataracting masses from zones as 109 develop between zones as 107 and 110. However, such slugs of material directed to the conveyor 50 do not produce an irregular, rapid flow or surge onto the tunnel conveyor 48 because of the action of the apparatus 50 to even out such surges or irregularities in flow of such granular material. Because there is no such surging, there is a smooth and efficient load on the conveyor belt 48.

For purpose of ready reference to parts shown in large scale in FIG. 6, the details of the action of apparatus 50 are explained in reference to buckets with referent numerals as for 85 of FIG. 6 in the position of that bucket shown for bucket 95B in FIG. 9. The parts of buckets 95A—H in FIG. 9 are given basic numerical referent numerals identical to the referent numerals for like parts on the bucket 85 in FIG. 6 and additional Roman letters for different buckets for purpose of providing ready reference to illustrations of the different appearance of the same structural features on different views thereof. Thus, the components of bucket 95A are given alphabetical letter designation "A" to the referent numerals applied to bucket 85 and the components of buckets 95B, 95C, 95D, 95E, 95F, 95G and 95H are given alphabetical letter designations B, C, D, E, F, G, H, respectively, additional to the referent numerals applied to bucket 85 for like parts.

The grain at top surface of mass 44 reaches each bucket shown as 85 in FIG. 10A, B and C, when in position of bucket 95B in FIG. 9, by travel along the surface 101 of the grain mass 44 as shown in FIG. 3A. When the buckets are empty, as shown in FIG. 10B, the plane of the front bucket wall 85 at edge 88 makes an acute angle with the plane of travel of the portion of belt 66 to which each rear bucket wall as 84 is attached. Grain contacted by the straight leading bucket edge as 88 enters by a path as 85P the chamber 87 within the bucket, and, depending on the speed of the bucket — usually 2 to 3 feet per second in the particular embodiment herein shown — and the depth 88A of its leading edge 88 in the grain mass — usually one-half inch in the particular embodiment herein described — pours from the bucket entrance 86 forwardly in the direction of motion of the bucket from the upper portion of the bucket in paths as 85Q and 85R shown in FIG. 10A. When the bucket is fairly empty, the angle between (a) the surface of the grain 88S below the belt and in front of the edge 88 with (b) the grain at the top surface 85T within the bucket, which angle is shown as 85U in FIG. 10A is an obtuse angle.

As the height of the grain above the level of the leading edge increases to 88V, as shown in FIG. 10C, which increase in height occurs when a cataracting mass of grain enters the space between two sequential buckets one of which is, as shown in FIG. 10C, the bucket 85, the bucket 85 is filled with such initially semi-fluid flowing particulate mass, but, once full, the mass of particulate material is relatively compact and the bucket opening presents a surface of compacted grain to the semifluid flowable particulate mass in front of it. Accordingly, each bucket, as 85, under such loading conditions, produces a relatively compact surface of grain, at least more compact than the flowable mass in front of it. Such surface, 88W, of relatively compact grain extends from the leading front wall edge 88 upward and forward to a line joining the rear edges as 89.1 of each of the bucket side walls 81 and 82 with rear wall 84; there is then an acute angle 88X between such compacted grain surface and the grain surface as 88S' below the belt 66. The thus filled bucket then passes over the surface of the grain in a gliding or hydroplaning action due to the dynamic reaction of the semi-fluid grain top surface with the downwardly and forwardly facing relatively compact surface formed by the rigidly supported mass of grain within each bucket.

On cataracting of the grain from the mass such change of level of the grain in advance of the bucket occurs rapidly. The combination then of the bucket plus grain therein, accordingly, changes the effective shape of the bucket mouth as cataracting occurs and effectively changes the "angle of attack" of the bucket and the grain mass therein. Such mass is flowable and semi-fluid when in a bucket which is relatively empty, but the mass in the buckets therein is compacted when the buckets be full and thereby provides the hydroplaning action at position 11C of FIG. 11A, while also moving grain in front of the bucket (mass 11G).

Figures 11A, 11B:
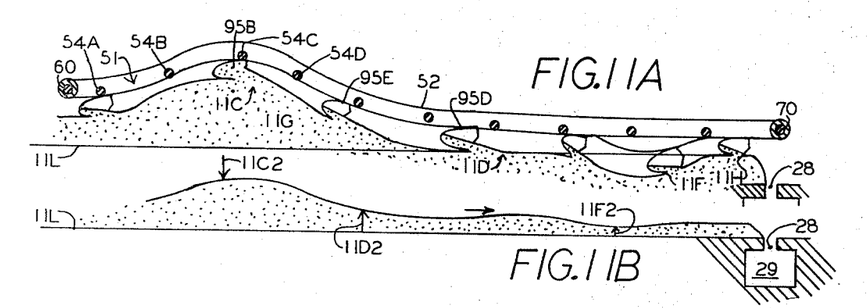
FIG. 11A is a diagramatically illustrative longitudinal vertical cross-sectional view of the operation of apparatus 50 and a mass of material operated on thereby at one moment in its operation.
FIG. 11B is a diagrammatic view of the mass of material after operated on in the manner shown in FIG. 11A.

Thereafter, as shown in FIG. 11A, when lower spots as 11D are traversed by the buckets of apparatus 50 each bucket empties; when high spots are traversed as at 11C each bucket, while skimming, takes only a limited amount of material from such high spots, partly glides over such high spots, and also causes that the belt 66 flex (because the bucket creates a compact angled surface that provides for a hydroplaning or a gliding action of the belt and the bucket over such high spots). The thus filled bucket (at 11C) moves portions of grain to lower spots as 11F: at normal depth of the leading edge 88 of the bucket as at zone 11H, the buckets transport material from such place of encounter and moves such mass toward the hole 28.

The frame is sufficiently light that the gliding or hydroplaning action of the bucket may raise th frame. If the frame is too heavy or inflexible, the entire tensile stresses applied to the belt by the motor 72 and its drive pulley 70 are borne by one or two buckets engaging the grain and may thereby cause damage to such buckets. The support provided by cable 165 and the shaping and spacing of the buckets and the flexibility and lightness of the frame 51 avoids such strains and provides an evening out of the uneven input due to cataracting and irregular flow characteristics of the grain. While the frame is sufficiently light and flexible to provide for automatic lifting up to avoid jamming when a surge fills the space between the buckets, the frame 51 is sufficiently resilient to maintain sufficient tightness on the belt so that the drive pulley 70 can sufficiently firmly engage the belt to pull it. By this action, the variable input due to cataracting and irregular flow characteristics of the grain is corrected to provide a constant output skimming action which, over the entire length of the apparatus 50 (this is usually 40 to 100 feet long), provides for an even discharge through the hole 28 on to conveyor 48.

The structure of the apparatus 50 is also that the belt portion 68 that supports the lower group of buckets has its upper portion located above the bottom of the side frame members when the belt is raised by the hydroplaning action of the filled buckets whereby the side frame member acts as a skirt to prevent any accumulation of grain on the portion of the belt that might be caught within the drive pulley.

The foot posts A-H65, which are rigid rods firmly fixed to the side frame members, serve to maintain the frame in such alignment that is initially imposed thereon by the vertical movement of the entire apparatus 50 when located in the grain mass by being moved vertically downward thereon to level of bottom edge of the buckets at that point. These rods usually extend 2 to 3 inches below the bottom edge of leading edge 85 of each bucket and about 8 to 10 inches below the bottom edge of the frame members 51–52. These rods thus serve to prevent movement of the entire apparatus 50 in the direction transverse to the length thereof due to the impacting impulse of a mass of cataracting grain upon the side frame members. Also, these rod members permit that the rear portion of assembly 51 rise vertically as a slug or sudden deposit of grain is deposited in front of any one section of the frame 50. At the same time, the past presence of holes for such rods assist the rapid return of the apparatus to the alignment established by the location of those rigid rods in the mass of grain as 44.

The entire apparatus 50 is so light in weight and/or supported by cable 165 that the downwardly facing portions of the front surface of the buckets as 85 and the posts as A-H65 serve to support the weight of such apparatus at such a height of frame 51 over the grain that the movement of the leading edge of the angled front wall of the moving bucket automatically forces the grain into the buckets at a rate dependent on the linear speed of the belt (and buckets attached thereto) and the depth of the mass of grain above each such bucket leading edge. The linear speed of operation of belt 66 is sufficiently slow that the buckets supported thereon fill enough to rise enough to maintain the lower length of belt 66 above the grain surface when cataracting occurs. At the same time, the speed is sufficiently fast that the buckets do fill during the normal surges of filling with cataracting grain to provide this rising action. When cataracting occurs along a given length of the frame 51, as 11C, the buckets and belt in that zone of the apparatus 50 rise relative to the top surface of the grain created by such cataracting surface and also move the top surface 69 of the lower length 68 of the belt 66 above the bottom edge of the frame side member at that portion of the frame. This elevation of the belt relative to the mass of the grain occurs before the mass of cataracting grain rises to the level that meets and flows over the top surface of the lower length of belt 66. Vibration of the belt which occurs during normal operation and the lowered location of the top surface of the lower length 68 of belt 66 at a position below the bottom edge of the frame side member as shown in FIG. 6, where lower portions of the grain surface are traversed as in zone 11F of FIG. 11A provide for discharge of any grain from the top surface of the lower length of the belt 66.

Apparatus 50 causes a complete transfer of cataracting slug masses to a non-cataracting smoothly movable mass so as to feed the tunnel conveyor 48 at a rate which is sufficiently even to avoid any stoppages in the transfer of the grain from that tunnel conveyor to the other conveyors as the elevators 37 and 49 to the discharge element 34.

The apparatus 50 serves to move the grain smoothly because it extends as a unit of cooperating components for substantially the full width of the building 21 from the hole 28 to the side wall as 26. This unitary and long structure has a resilient vertical and longitudinal yielding of portions of its frame to accomodate the surges which are met by the buckets skimming along the surface of the grain mass therebelow. By the action of apparatus 50, the slugs of grain resulting from the cataracting action from masses as 44 do not choke tunnel conveyor 48; not only is such conveyor not choked but also the action of the conveyor is also a smoothing or averaging action which provides a uniform rate of flow from the discharge end at bucket 98A of the frame 51 through the hole 28 (shown in FIG. 4) notwithstanding irregularities along the path of movement of those buckets. For this smooth depositing action on belt 48 for smooth transport through the walk-through tunnel 29 it is essential that the frame 51 extend for as great a distance as is practical, from the hole 28 to close to the side wall. To accomodate to surges of grain into the buckets and raising of the frame 51, the frame 51 has a substantial (up to 12 inches) vertical resilient displacement (at the middle of its length) transverse to its length on a downward force of 20 pounds thereat due to the choice of dimensions of the frame so that it would be sufficiently flexible and resilient upwards and downwards for such purpose and also to act as a lengthwise compressible spring to maintain the tension in the dimensionally stable belt during belt movement to accomodate changes in shape of the belt 66 responsive to surges of grain. The dimensionally stable belt must necessarily be dimensionally stable in order to transmit the tension forces therealong to the buckets in their passage along the surface of the mass of grain and also to transfer such increments of the mass to the hole 28 in a smooth manner. The resilient frame 51 cooperates in this action.

As shown in FIG. 6, when at rest and located above the grain surface, the belt 66 has some slack and extends vertically downward from and below the frame 51. This slack limits the vertical force on the grain below the bucket at low points as 11F of FIG. 11.

The buckets as 80 and 91–98 of the apparatus 50 are made of fairly rigid plastic, such as polyvinyl chloride or high density polyethylene which are electrically non-conductive. Accordingly, such buckets, when contacting aeration ducts as 31 and 32 do not cause any damage thereto and so permit unloading of the grain as from mass 44 in a building as 21 to be carried on without removal of such aeration ducts, (as is necessary where movement of grain masses as 44 by front end loaders is attempted) and avoids creation of sparks.

The apparatus 50 and system 20 are above described as applied to grain — milo in particular — where the angle of repose is usually about 30°. Such angle is usually 26° for durum wheat, and 32° for oats.

The apparatus 50 and system 20 are not only applicable to such grains but are also applicable to particulate masses such as cement, fertilizer and chemicals. Where humidity is high and temperature variations marked, the irregularity of flow along the outer surface of such masses as above described for the grain mass 44 are similarly smoothed out by the apparatus 50 operating as above described for such materials as well as for the grain above particularly described.

The apparatus 50 may be readily disassembled for raising to top of vertically elongated circular bins and location in such circular bins and reassembly and operation there as well as used in horizontally extended circular bins in the same manner as above described for the flat floor of the rectangular storage building 21.

Figure 8:
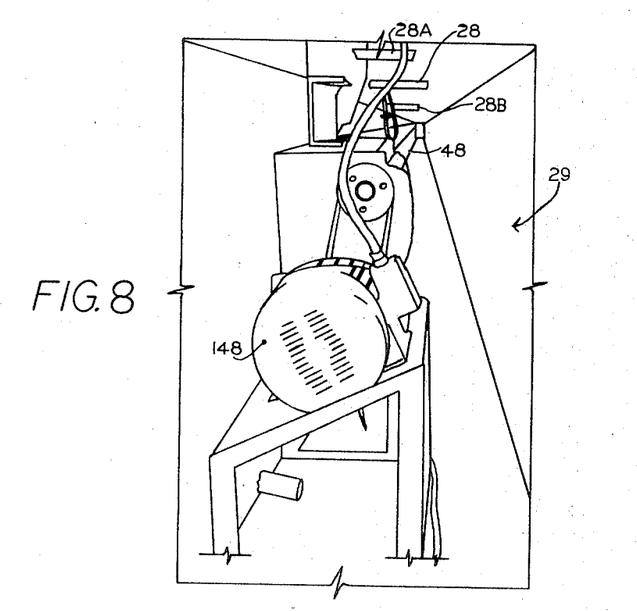
FIG. 8 is a diagrammatic view of the tunnel 29 of the assembly 20 of this invention.

As shown in FIG. 8 which is pictorial, the tunnel 29 is long (the length of the building 21, usually 200 to 400 feet) and narrow so that there is great inconvenience in cleaning any spillage from, or curing stoppages on, the belt 48. Therefore, the control of motor 148 which is operatively connected to belt 48 to drive it is made sensitive to overloads on the belt 48 and the entire operation of (a) unloading grain from floor 22 to discharge storage building 34 or (b) transferring masses of grain from one portion of floor 22 to another is greatly expedited and improved by the absence of surges and overloads to belt 48 because of the action of apparatus 50.

FIG. 11-B illustrates the change in the profile of mass as 44 effected by the action of apparatus 50 in the illustrative grain mass profile shown in FIG. 11-A; as there shown, zone 11-C is reduced in height as shown by arrow 11-C-2 while the zone between 11-C and 11-D is slightly increased in height, as shown by arrow 11-D-2 while zone 11-F is particularly increased in height as shown by arrow 11-F-2. A base line 11-L is provided in FIGS. 11-A and 11-B to illustrate such changes. These figures illustrate the evening out of irregularities in the contour traversed by the apparatus 50. After such evening of contour, the rate of discharge of material from the mass 44 to the hole 28 by apparatus is even.

Data on the preferred embodiment of the invention illustrated in the Figures are set out in Table I.

TABLE I (DATA OF PREFERRED EMBODIMENT 50)

| | |
|---|---|
| I beams 52 and 53, | height × width 6" × 0.3"<br>Material 6061–T6 Aluminum alloy<br>Weight 91 pounds per 25 feet<br>Length 47 feet |
| Belt 66, | 12 inches wide<br>Polyvinyl Chloride<br>Less than 1% stretch<br>Weight — 119.8 lbs. total<br>1.27 lbs/ft |
| Weight of Components: | A. Tail pulley and bucket and belt and frame (exclusive of items in B below) 420 lbs<br>B. Gear box, head frame and motor 268 lbs |

Total weight on grain is less than 10 lbs. per square foot by portion resting on grain.

Each of buckets as 80 are on 18 inch centers along belt 66 and each bucket weighs 1¾ lbs. Bucket wall thickness is ¼ inch at walls 81, 82, 83, 84 and 3/16 inch at edge 88. Edge 88 is 3¾ inches from bottom of bucket. Edge 84.1 is 6¼ inches from bottom of bucket.

Surface 88W (defined in text) is 65° to plane of wall 84.

Overall width of bucket is 11 inches.

I claim:

1. A system for storing and unloading flowable particulate material comprising, in operative combination, a grain building comprising a solid flat floor provided with an overhead sloped roof, a vertical front wall, a vertical rear wall, left side vertical wall, right side vertical wall and a plurality of spaced apart tunnel conveyor feed discharge holes as in the floor leading to a conveyor in an underground walk-through conveyor tunnel which tunnel and conveyor extend the full length of said building below said floor, and a movable conveyor assembly comprising a light, flexible resilient frame and, supported thereon, a dimensionally stable conveyor belt supporting a series of like buckets, each bucket with a downwardly and forwardly facing opening and each bucket with an upwardly and rearwardly sloped bottom wall and having side walls, said belt is supported on said frame and extends horizontally from near to the side of said storage building to the conveyor feed holes in the floor thereof, a motor operatively connected to a drive pulley said drive pulley and a tail pulley supported on said frame, said belt supported on said drive pulley and tail pulley, said frame maintaining said belt in operative connection to said drive pulley and wherein each of said buckets has a lower leading edge, side edges and a top edge defining an opening that is forwardly and downwardly directed and wherein said frame comprises a pair of like resilient flexible side members joined by rigid transverse members extending therebetween and firmly attached thereto, and said side members are uniformly spaced apart a greater distance than the width of said belt and said belt is wider than the said buckets.

2. Apparatus as in claim 1 wherein each bucket comprises an imperforate left side member, a right side member, a curved bottom portion, a rear plate and a front wall; said bucket opening is provided between said front edge of the front wall of the bucket and the rear wall, said rear wall is firmly attached to said belt, said members being imperforate and rigid and defining an open chamber, each of the side walls having a leading edge; each side wall edge has
   a. a rear side edge straight portion perpendicular and adjacent to rear wall and adjacent to the lateral portion of edge of said rear wall;
   b. a front side edge portion parallel to the rear wall and adjacent to and extending forwardly from the leading edge of the bucket front wall; and
   c. an intermediate sloped side edge portion that extends diagonally upwardly and forwardly, and a flat plane between said front edge and top edge of rear wall defines the forwardly and downwardly directed opening of said bucket.

3. Apparatus as in claim 2 wherein the floor is rectangular in outline and the tunnel extends parallel to the length thereof and the walls of the building support longitudinally extending support means extending between the walls thereof and adjustable and movable support means extend from a point on said frame of said movable conveyor distant from said hole in the building floor to said longitudinally extending support means.

* * * * *